United States Patent [19]

Bock et al.

[11] Patent Number: 4,702,319

[45] Date of Patent: Oct. 27, 1987

[54] ENHANCED OIL RECOVERY WITH HYDROPHOBICALLY ASSOCIATING POLYMERS CONTAINING SULFONATE FUNCTIONALITY

[75] Inventors: Jan Bock, Bridgewater; Paul L. Valint, Asbury; Salvatore J. Pace, Glen Gardner, all of N.J.

[73] Assignee: Exxon Research and Engineering Company, Florham Park, N.J.

[21] Appl. No.: 947,285

[22] Filed: Dec. 29, 1986

[51] Int. Cl.$^4$ ............................................. E21B 43/22
[52] U.S. Cl. .................................. 166/275; 252/8.554
[58] Field of Search ....................... 166/273, 274, 275; 252/8.554

[56] References Cited

U.S. PATENT DOCUMENTS

| | | | |
|---|---|---|---|
| 3,760,879 | 9/1973 | Norton et al. | 166/275 |
| 4,049,054 | 9/1977 | Wier | 166/275 X |
| 4,254,249 | 3/1981 | Cottrell et al. | 252/8.554 X |
| 4,271,907 | 6/1981 | Gale | 166/275 X |
| 4,288,334 | 9/1981 | McCoy et al. | 166/275 X |
| 4,404,111 | 9/1983 | Bi et al. | 252/8.554 |
| 4,484,631 | 11/1984 | Sherwood et al. | 166/274 |
| 4,520,182 | 5/1985 | Turner et al. | 526/307.2 |
| 4,521,317 | 6/1985 | Candau et al. | 252/8.554 |
| 4,573,533 | 3/1986 | Ryles et al. | 166/275 |
| 4,592,850 | 6/1986 | Castner | 166/275 X |

*Primary Examiner*—George A. Suchfield
*Attorney, Agent, or Firm*—Richard E. Nanfeldt

[57] ABSTRACT

This invention relates to a method for enhanced recovery of petroleum from a subterranean oil-bearing formation. More particularly, this invention relates to secondary or tertiary recovery of oil employing a polymer thickened aqueous drive fluid. The polymeric viscosifier for the drive fluid is selected from a class of hydrophobically associating water soluble polymers containing one or more water soluble monomers and a water insoluble monomer or group. The water soluble groups are acrylamide and a salt of an ethylenically unsaturated sulfonic acid and the water insoluble group is a higher alkyl acrylamide. These polymers, when dissolved in an aqueous brine solution, have the ability to substantially increase the viscosity of the solution. The control of displacement fluid mobility results in more uniform sweep efficiency and improved oil recovery. In addition, aqueous solutions of these hydrophobically associating polymers exhibit enhanced viscosification, reduced salt sensitivity and other desirable rheological properties found useful in chemically enhanced oil recovery processes.

10 Claims, No Drawings

ENHANCED OIL RECOVERY WITH HYDROPHOBICALLY ASSOCIATING POLYMERS CONTAINING SULFONATE FUNCTIONALITY

BACKGROUND OF THE INVENTION

1. Field of the Invention

This invention relates to a method for enhanced recovery of petroleum from a subterranean oil-bearing formation. More particularly, this invention relates to secondary or tertiary recovery of oil employing a polymer thickened aqueous drive fluid. The polymeric viscosifier for the drive fluid is selected from a class of hydrophobically associating water soluble polymers containing one or more water soluble groups and a water insoluble monomer or group. The water soluble groups are acrylamide (AM) and a salt of an ethylenically unsaturated sulfonic acid (S) and the water insoluble group is a higher alkylacrylamide (R). These polymers, hereinafter referred to as SRAM, when added to an aqueous brine solution have the ability to substantially increase the viscosity of the solution. The control of displacement fluid mobility results in more uniform sweep efficiency and improved oil recovery. In addition, aqueous solutions of these hydrophobically associating polymers exhibit enhanced viscosification, reduced salt sensitivity, and other desirable rheological properties found useful in chemically enhanced oil recovery processes.

2. Description of the Prior Art

The recovery of petroleum from oil-bearing formations initially involves drilling into the reservoir and utilizing the natural pressure forces for production. However, these primary production methods recover only a minor portion of the oil present in the reservoir. To further improve oil recovery a variety of techniques have been employed. These include miscible techniques, such as gas flooding; thermal methods, such as heating or steam injection; chemical methods, such as surfactant/polymer or alkaline injection; and water flooding processes. While these methods address the need to reduce oil viscosity, or repressurize the formation, many deficiencies still exist which limit the amount of additional oil recovery. For example, a well-known limitation involves the poor sweep efficiency caused by the drive or displacment fluid water having a higher mobility than the oil-in-place. This results in an instability manifested by viscous fingering of the drive or displacment fluid through the oil and a reduction in recovery efficiency.

It has long been known that water soluble polymers can be added to the drive water to increase viscosity or reduce mobility. Polyacrylamide (PAM) and partially hydrolyzed polyacrylamide (HPAM) are well known water soluble polymers used as flocculation aids for waste water treatment and dewatering sludge, and for rheology control for secondary or tertiary oil recovery. Further examples of the properties and use of these polymers can be found in *Handbook of Water Soluble Gums and Resins,* R. L. Davidson, Ed., McGraw Hill 1980, Chapter 16 by H. Volk and R. E. Friedrich or in *Water-Soluble Polymers,* N. M. Bikales. Ed., Plenum Press, 1973, by D. C. MacWilliams, J. H. Rogers and T. J. West. The use of these polymers for secondary recovery of petroleum has been described by Sandiford and Keller in U.S. Pat. No. 2,827,964. Kolodny, U.S. Pat. No. 3,002,960, describes a method for preparing higher molecular weight PAM based on redox initiation. McKennon, U.S. Pat. No. 3,039,529, describes the importance of controlling the extent of hydrolysis or the amount of anionially charged carboxyl groups to minimize adsorption during secondary recovery of petroleum with these HPAM polymers. A series of improvements in HPAM polymers for secondary oil recovery are described in U.S. Pat. Nos. 3,087,543, 3,308,885, 3,721,295, 3,724,547, 3,779,316, 3,780,806, 3,893,510, and 4,034,809.

Polyacrylamides rely on a combination of high molecular weight and chain expansion due to repulsion of pendent ionic groups along the polymer chain to viscosify or thicken aqueous fluids. However, high molecular weight polymers mechanically degrade when subjected to large elongational or shear stresses such as found in pumps or during injection into reservoir rocks. This degradation results in permanent reduction in polymer molecular weight and in turn loss of visicosification efficiency. Gogarty, U.S. Pat. No. 3,580,337, suggests the use of water-soluble salts composed of divalent cations to stabilize HPAM solutions with regard to mechanical degradation. However, subsequent studies by Maerker (*Soc. Pet. Engr. J.,* 1975) indicate that the presence of divalent cations such as calcium leads to increased mechanical degradation during injection into porous media. The presence of cations in aqueous solution, in particular divalent cations, shields the charged groups on the polymer. This causes the polymer chains to collapse into a random coil type configuration losing significant viscosification efficiency. Thus, polymer viscosifiers based on an alternative mechanism of viscosification providing improved mechanical stability and salt tolerance relative to PAM and HPAM polymers would be highly desirable.

The use of alternate polymer structures to overcome the deficiencies in polyacrylamide systems has been explored. For example, Norton, U.S. Pat. No. 3,747,676, describes an oil recovery process using a methylolated unhydrolyzed polyacrylamide while Morduchowitz, U.S. Pat. No. 4,323,463, describes terpolymers of acrylamide, acrylonitrile and acrylic acid. In the area of anionic sulfate or sulfonate containing systems, Kaufman, U.S. Pat. No. 3,679,000, uses N-sulfohydrocarbon substituted acrylamide polymers. Hunter discloses in U.S. Pat. No. 4,226,730 and 4,226,731 secondary recovery processes using a water soluble ethoxylated polyphenol which is sulfated or sulfonated; and in U.S. Pat. Nos. 4,338,203 and 4,343,712 he describes copolymers of acrylamide with vinyl sulfonic acid and styrene sulfonic acid alkoxylated to various extents. None of these patents describe solution rheological properties differentiating or distinguishing these polymers from the prior art. More recently water soluble copolymers of acrylamide and sulfonated monomers have been studied as aqueous fluid viscosifiers. For example, C. L. McCormick and G. S. Chen, *J. of Polymer Science: Polymer Chemistry Ed.,* Vol. 20, 817–838 (1982) describe the synthesis and characterization of random copolymers of acrylamide and sulfonated monomers such as sodium-2-sulfoethyl methacrylate or sodium-2-acrylamido-2-methylpropane sulfonate. In a recent paper on the dilute solution properties of these polymers, H. H. Neidlinger, G. S. Chen and C. L. McCormick, *J. of Applied Polymer Science,* Vol. 29, 713–730 (1984) noted the high salt sensitivity of these polymers, particularly for copolymer compositions containing more than about 25 mole percent sulfonate monomer.

Processes for preparing polyacrylamides are well known in the art; Tanaka et al., U.S. Pat. No. 4,154,910 teaches an aqueous solution method using the heat of polymerization to concentrate the product. Zimmermann et al., U.S. Pat. No. 3,211,708 teaches an oil-in-water bead polymerization for polymerizing water soluble monomers. These techniques result in moderate molecular weight polymers exhibiting poor viscosification efficiency particularly in saline solutions. Kolodny, U.S. Pat. No. 3,002,960 teaches a low temperature, redox initiated solution polymerization resulting in high molecular weight polyacrylamide. Another approach to high molecular weight water soluble polymers is described by J. W. Vanderhoff et al., U.S. Pat. No. 3,284,393, where water soluble monomers are polymerized at high concentration in a water-in-oil emulsion. While some of these processes allow high molecular weight polymers to be prepared, the resulting PAM and HPAM systems provide only fair viscosification efficiency, poor mechanical stability and low salt tolerance.

One approach to overcoming the deficiencies in these polyacrylamide based systems is described by Turner et al., U.S. Pat. No. 4,520,182. Water soluble acrylamide copolymers containing a small amount of oil soluble or hydrophobic alkylacrylamide groups were found to impart efficient viscosification to aqueous fluids. Furthermore since these alkylacrylamide-acrylamide copolymers (RAM) were nonionic, they were relatively insensitive to the level of salt in the water. However, these polymers required concentrations above about 2000 ppm to provide significant viscosification. Landoll, U.S. Pat. No. 4,304,902 describes copolymers of ethylene oxide with long chain epoxides which also required relatively large polymer concentration (approx. 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low requiring 2 to 3 weight percent polymer to provide a sufficient enhancement in viscosity. The use of surfactants to enable solubility and in turn viscosification by a water soluble polymer containing hydrophobic groups is described by Evani, European Pat. No. 4,432,881. The hydrophobic group claimed is attached to the polymer via an acrylate linkage which is known to have poor hydrolytic stability. In addition, the need for a surfactant to achieve solubility and thickening efficiency should make such a system very salt sensitive as well as very sensitive to small changes in surfactant and polymer concentration. Emmons et al., U.S. Pat. No. 4,395,524 teaches acrylamide copolymers as thickeners for aqueous systems. While these polymers possess hydrophobic groups, they are prepared using alcohol containing solvents which are known chain transfer agents. The resulting polymers have rather low molecular weights and thus relatively high polymer concentrations are required to achieve reasonable viscosification of water based fluids.

One of the objects of this invention is to overcome the deficiencies in the use of the water soluble polymers of the prior art for secondary or tertiary oil recovery operations. The present invention uses a new class of water soluble polymer described by Bock et al in co-pending applications U.S. Ser. Nos. 845,195 and 845,197 filed Mar. 28, 1986 and incorporated herein by reference. These polymers have been found to impart enhanced viscosification to aqueous fluids, improved mechanical stability and better salt tolerance, characteristics highly desirable for secondary and tertiary oil recovery. These polymers contain a nonionic water soluble monomer such as acrylamide (AM), an anionically charged water soluble ethylenically unsaturated sulfonated monomer (S), such as an alkali metal salt of a vinyl alkylsulfonic acid and a water insoluble or hydrophobic monomer such as an alkylacrylamide (R) with a chain length of six carbons or greater. When these SRAM polymers are placed in an aqueous solvent, the hydrophobic groups aggregate or associate in a manner similar to a surfactant. This hydrophobic association between polymer chains in solution results in an increase in the effective hydrodynamic size of the molecule which in turn causes an increase in solution viscosity. The presence of ionic sulfonate groups, such as sodium 2-acrylamido-2-methylpropane sulfonate, AMPS ®, causes an expansion of the polymer in solution, an improvement in polymer solubility and a favorable interaction with the hydrophobic groups. Thus, polymers containing both ionic sulfonate groups and hydrophobic groups provide a significant improvement in viscosification efficiency of water based systems and other properties useful for secondary and tertiary oil recovery.

Synthesis of the hydrophobically associating polymers used in the secondary or tertiary oil recovery process of the instant invention presents difficulties. In order for polymerization to be effected, the monomers must obviously come into close proximity to one another. The incompatibility of the oil soluble and water soluble monomers prevents an effective concentration of one or the other of these monomeric species from being achieved at the locus of polymerization of the other comonomer. Techniques for polymerizing water soluble polymers such as those taught in U.S. Pat. Nos. 4,154,910, 3,211,708, 3,002,960 and 3,284,393 cannot be used to prepare the compositions of this invention. This art does not teach the formation of a sufficiently fine dispersion of the water and oil soluble monomers to enable uniform reaction and preparation of efficient aqueous viscosifiers. The use of mutual solvents or solvent mixtures to dissolve the water and oil soluble monomers as taught by Lenke et al., U.S. Pat. No. 4,151,333 and Barua et al., U.S. Pat. No. 4,098,987 also has some serious limitations. Although this approach undoubtedly allows the incompatible monomers to come into close proximity to one another, since the dispersion is on a molecular scale, often the resulting copolymer is insoluble in the same solvent as shown in U.S. Pat. No. 4,151,333. This leads to precipitation of the copolymer before it has achieved sufficient molecular weight to provide efficient aqueous viscosification. The use of water miscible solvents such as alcohols, ether and acetone either alone or with water as taught in U.S. Pat. No. 4,098,987 results in extremely low molecular weight (e.g. 10,000) polymers due to the high chain transfer characteristics of these solvents. Thus, polymers produced by these teachings are rather ineffective viscosifiers for aqueous fluids.

Two techniques have been found most useful for preparing the hydrophobically associating copolymers used in the secondary and tertiary oil recovery process of this invention. The first method was based on the use of a water continuous microemulsion to disperse the oil soluble monomer in a solution of the water soluble monomers. Details of the procedures and techniques are taught by Turner et al. in U.S. Pat. No. 4,521,580. A second and preferred method for preparing the compositions of this invention was based on dispersing the oil soluble monomers using an aqueous micellar solution of the water soluble monomers. Suitable surfactants and the details of the polymerization are taught in copending application U.S. Ser. No. 845,195. While either the microemulsion or micellar polymerization techniques can be used to prepare hydrophobically associating polymers containing a variety of water soluble nonionic monomers, a problem arises when the monomers have a strong interaction with the surfactants used in the polymerization. In particular, strong ionic interactions or complexes can be formed between anionic water soluble monomers such as ethylenically unsaturated alkyl sulfonates and cationic surfactants such as quaternary alkyl amines. Further details of the preparation of the terpolymers can be found in copending applications, U.S. Ser. Nos. 845,195 and 845,197.

It is an object of this invention to improve the viscosification efficiency of brine solutions used for secondary and tertiary oil recovery and thus provide an improved process for the recovery of oil from subterranean formations. It is a further object to improve the salt tolerance and mechanical stability of brine drive solutions used for mobility control during secondary and tertiary oil recovery operations. Yet another object of this invention is to provide a water soluble additive for use in rheological control during secondary and tertiary oil recovery operations.

SUMMARY OF THE INVENTION

This invention relates to a method for enhanced recovery of petroleum from a subterranean oil-bearing formation. More particularly, this invention relates to secondary or tertiary recovery of oil employing a polymer thickened aqueous drive fluid. The polymeric viscosifier for the drive fluid is selected from a class of hydrophobically associating water soluble polymers containing one or more water soluble monomers and a water insoluble monomer or group. The water soluble groups are (meth)acrylamide and a salt of an ethylenically unsaturated sulfonated monomer and the water insoluble group is a N-alkyl(meth)acrylamide. These polymers, when dissolved in an aqueous brine solution, have the ability to substantially increase the viscosity of the solution. The control of displacement fluid mobility results in more uniform sweep efficiency and improved oil recovery. In addition, aqueous solutions of these hydrophobically associating polymers exhibit enhanced viscosification, reduced salt sensitivity and other desirable rheological properties found useful in chemically enhanced oil recovery processes.

DETAILED DESCRIPTION OF THE INVENTION

This invention relates to a process for recovering oil from a subterranean oil-bearing formation. It entails the use of an aqueous treating media which comprises a hydrophobically associating terpolymer of (meth)acrylamide, a salt of an ethylenically unsaturated sulfonic acid, and an N-alkyl(meth)acrylamide. The aqueous treating solution will generally contain some salts compatible with the reservoir fluids. The treating solution may also contain surfactants or cosurfactants to lower the interfacial tension with the resident crude oil. In addition oil may be present to compatibilize the surfactants and polymer. The treating solution may be a microemulsion or a surfactant solution which becomes a microemulsion when contacting the reservoir fluids during oil recovery operations.

The relative amounts of the monomers comprising the terpolymers used in the process of this invention are critically chosen to provide a balance between aqueous solubility, brine tolerance, viscosification efficiency, and mechanical stability. In addition, the composition of these polymers will also influence their adsorption onto rock and interaction with surfactants.

The water soluble polymers used in the process of this invention are characterized by the formula:

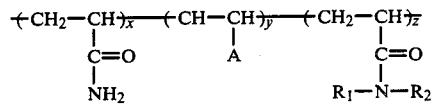

$A = SO_3^- M^+$, phenyl-$SO_3^- M^+$, $CONHC(CH_3)_2CH_2SO_3^- M^+$ wherein $R_1$ is preferably a $C_6$ to $C_{22}$ straight chained or branched alkyl or alkylcycloalkyl group, more preferably a $C_6$ to $C_{20}$, and most preferably a $C_6$ to $C_{18}$, and $R_2$ is the same or different alkyl group as $R_1$, or hydrogen or $C_1$ to $C_3$ straight chained or branched alkyl group; and $M^+$ is an alkali metal or ammonium cation. Typical, but nonlimiting examples of preferred alkyl groups are hexyl, octyl, decyl, dodecyl and hexadecyl groups. Typical, but non-limiting examples of preferred cations are sodium, potassium and ammonium. The mole percentage of acrylamide, x, is preferably about 5 to about 98, more preferably about 10 to about 90, and most preferably about 20 to about 80. The mole percentage of the salt of the sulfonate containing monomer, y, is preferably about 2 to about 95, more preferably about 5 to about 90, and most preferably about 10 to about 80. The mole percentage of the hydrophobic group, z, is preferably about 0.1 to about 10.0, more preferably about 0.2 to about 5.0 and most preferably about 0.2 to about 3.0.

The molecular weight of the water soluble terpolymers of this invention is sufficiently high that they are efficient viscosifiers of water or brine, but not so high that the polymer molecules are readily susceptible to irreversible shear degradation. Thus, the weight average molecular weights are preferably about 200,000 to about 10 million, more preferably about 500,000 to about 8 million and most preferably about 1 million to about 7 million. The intrinsic viscosity of these polymers as measured in 2% sodium chloride solution is preferably greater than about 1 dl/g.

The terpolymers may be synthesized by a variety of processes. Two of the most preferred processes rely on dispersing the water insoluble or hydrophobic monomer on a very fine scale into an aqueous solution of the water soluble monomer. The product in both cases is substantially free of microgel or particulates of insoluble polymer. The process for synthesizing these terpolymers relies on solubilizing the water insoluble monomer into a predominantly aqueous media by the use of a suitable water soluble surfactant, such as sodium dodecyl sulfate. When mixed with an aqueous solution of the water soluble acrylamide monomer and the water soluble sulfonate monomer, the surfactant solution can disperse the water insoluble monomer on an extremely fine scale so that the reaction mixture is isotropic, clear, and homogeneous. These micellar reaction mixtures are free of visible oil droplets or particulates of the water insoluble monomer. The terpolymerization can, therefore be initiated by water soluble initiators to yield terpolymers which are substantially free of visible particulates. The resultant reaction mixture remains homogeneous throughout the course of the reaction without the need for agitation with external mixers or stirrers. Further details of this polymerization technique can be found in copending application, U.S. Ser. No. 845,195 which is herein incorporated by reference. The critical aspect is that the micellar reaction mixture of monomers permits a uniform polymerization to occur such that the resultant polymer does not contain particulates or lattices of water insoluble polymer.

The surfactants which may be used in the polymerization process may be one of the water soluble surfactants such as salts of alkyl sulfates, sulfonates and carboxylates or alkyl arene sulfates, sulfonates or carboxylates. Preferred are sodium or potassium salts of decyl sulfate, dodecyl sulfate or tetradecyl sulfate. For these ionic surfactants, the Krafft point, which is defined as the minimum temperature for micelle formation, must be below the temperature used for the polymerization. Thus, at the conditions of polymerization, the desired surfactant will form micelles which solubilize the water insoluble monomer.

Nonionic surfactants can also be used for preparing the polymers of this invention. For example, ethoxylated alcohols, ethoxylated alkyl phenols, ethoxylated dialkyl phenols, ethylene oxide-propylene oxide copolymers and polyoxyethylene alkyl ethers and esters can be used. Preferred nonionic surfactants are alkoxylated alcohols or alkyl phenols such as ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule.

Surfactants which contain both nonionic and anionic functionality, e.g. sulfates and sulfonates of alkoxylated alcohols and alkyl phenols can also be used. Combinations of anionic and nonionic surfactants can also be used as long as the surfactants solubilize the hydrophobic monomer into an aqueous phase containing the water soluble monomers. The surfactant or mixtures of surfactants are used at concentrations above the critical micelle concentration and preferably at concentrations such that only one or at most a few hydrophobic monomers are associated with a surfactant micelle. Thus, the actual concentration of surfactant for a given polymerization depends on the concentration of oil soluble or hydrophobic monomers employed.

Polymerization of the water soluble and water insoluble monomers is effected in an aqueous micellar solution containing a suitable free radical initiator. Examples of suitable water soluble free radical initiators include peroxides such as a hydrogen peroxide and persulfates such as sodium, potassium or ammonium persulfate. Suitable oil soluble initiators are organic peroxides and azo compounds such as azobisisobutyronitrile. Water soluble initiators such as potassiuim persulfate are preferred. Redox initiation involving an oxidant such as potassium persulfate and a reductant such as sodium metabisulfite can also be used to initiate polymerization, particularly at low temperatures. Polymerizing at lower temperature results in the formation of higher molecular weight polymers which are desirable from the standpoint of efficient aqueous viscosification. Typically it is desired to employ from about 0.01 to about 0.5 weight percent of initiator based on the weight of monomers. The polymerization temperature is preferably about 20 C. to about 90 C., more preferably about 25 C. to about 80 C. and most preferably about 30 C. to about 70 C.

The hydrophobically associating polymers described above have been found to impart many desirable characteristics to the mobility control fluids used in the oil recovery process of the present invention. To prepare these thickened mobility control fluids, an amount of the terpolymer thickening agent is dissolved in the aqueous fluid by agitation using any of a number of techniques well known in the art. For example a marine impeller operating at relatively low speed can be used to first disperse and then dissolve these hydrophobically associating terpolymers. It is desirable to use relatively low agitation conditions since these polymers have a tendency to cause and stabilize foams which can be difficult to break. The aqueous solutions may be relatively fresh water or contain high concentrations of electrolyte such as in hard water or brine. Monovalent inorganic salts such as sodium chloride and divalent salts such as calcium or magnesium chloride or sulfate can be present in the brine in substantial amounts. A preferred method for preparing the thickened brine solutions involves first preparing a concentrated solution of the polymer in relatively fresh water and then adding a concentrated brine solution to obtain the desired final thickened brine solution. The amount of polymeric thickening agent needed to produce a desired level of viscosification will depend on the composition of the electrolytes in the aqueous reservoir fluid and the temperature of the reservoir. In general, more polymer will be required as the electrolyte concentration increases and as the temperature increases. Viscosification of about 2 to about 100 times or more than that of the neat solvent can readily be achieved with the terpolymers of this invention. Preferably about 0.01 to about 2.0 weight percent, more preferably about 0.02 to about 1.0 weight percent and most preferably about 0.05 to about 0.5 weight percent polymer based on the aqueous medium will provide the desired level of thickening efficiency.

The thickening efficiency of a given polymer is influenced by the amount of anionically charged sulfonate groups, the level and type of hydrophobic groups and the molecular weight. The addition of anionic sulfonate containing groups improves polymer solubility and enhances thickening efficiency due to repulsion of charges along the backbone which tends to open the polymer coil and increase hydrodynamic volume. In addition, the presence of these groups tends to reduce absorption of the polymer onto the reservoir rock during enhanced oil recovery operations. The hydrophobic groups decrease polymer solubility and associate in solution to reversibly bridge polymer molecules creating greater resistance for flow, and hence, increased viscosity. The more insoluble the hydrophobic group is in the solvent, the less that is needed to create the associations in solution. For example, less N-dodecylacrylamide is needed in a polymer to create the same viscosification as a larger amount of N-octylacrylamide in a similar polymer. In addition it is possible to have too much association, in which case the polymer becomes insoluble in the solvent and cannot be used as a viscosifier. During enhanced oil recovery operations, too much hydrophobe in the polymer can lead to increased polymer adsorption and, in extreme cases, to plugging. Thus, the amount of hydrophobic groups present in the polymer must be critically controlled. Fortunately, the solubility and rock adsorption characteristics of the sulfonate and hydrophobic groups go in opposite directions and, thus, the addition of more sulfonate containing monomer can be used to counterbalance the addition of hydrophobic groups. Increasing both sulfonate and hydrophobic groups can result in a synergistic enhancement of thickening efficiency and in turn, mobility control.

Molecular weight of the polymer is also an important consideration. High molecular weight polymers incorporating both anionically charged sulfonated groups and hydrophobic groups can provide significantly improved viscosification of water based fluids. All other things being equal, the higher the molecular weight the less soluble the polymer. Thus, as molecular weight is increased, the amount of hydrohobic groups should be reduced and the amount of sulfonate containing groups increased. It is desirable that the resulting polymer in an aqueous solution not be susceptible to irreversible mechanical degradation under shear or elongational stress experienced during injection in reservoir formations. This places an upper limit on polymer molecular weight to minimize loss of viscosification during injection. This depends on polymer composition, injection fluid composition, injection rate and rock properties such as permeability and porosity. Control of molecular weight is achieved by adjusting polymerization conditions such as the concentration of monomers, the type and level of initiator and the reaction temperature. As is well known in the art, the molecular weight is increased by increasing the monomers level and decreasing the initiator level and reaction temperature.

To evaluate and characterize the unique and useful properties of the hydrophobically associating polymers used in the process of this invention, dilute solution viscometric measurements were made. These measurements are particularly useful for evaluating the effect of composition and polymerization process conditions on the hydrodynamic size per unit weight of the polymer in solution and the influence of associating groups. The hydrodynamic size is measured by the intrinsic viscosity, which is related to some power of the viscosity average molecular weight. To determine the intrinsic viscosity, the reduced viscosity is first evaluated at several polymer concentrations in the dilute regime. The reduced viscosity is defined as the incremental viscosity increase of the polymer solution relative to the pure solvent normalized with respect to the pure solvent viscosity and the polymer concentration. A plot of reduced viscosity versus polymer concentration should yield a straight line at sufficiently low polymer concentrations. The intercept of this reduced viscosity plot at zero polymer concentration is defined as the intrinsic viscosity while the slope is the Huggins' interaction coefficient times the square of the intrinsic viscosity. The Huggins' constant is a measure of polymer-solvent interactions. For hydrophobically associating polymers, it is characteristically greater than the 0.3 to 0.7 value normally observed for nonassociating polymers such as polyacrylamides.

Measurements of the dilute solution viscosity were made with conventional Couette or capillary viscometers. As set of Ubbelohde capillary viscometers were used in this study. Shear rate effects were found to be negligible in the concentration range of interest. However, since the terpolymers contain anionically charged groups, a polyelectrolyte effect was observed in dilute solution. This polyelectrolyte effect resulted in an increase in reduced viscosity with decreasing polymer concentration and tended to mask the effect of hydrophobic associations. The addition of salts such as sodium chloride or sodium sulphate shields the charge repulsion causing the polyelectrolyte effect and resulted in the desired linear reduced viscosity vs concentration plot. The dilute solution measurements were thus made on solutions containing 2.0 weight percent sodium chloride.

The solution viscosity of associating polymers in the semi-dilute concentration regime is dramatically different than conventional water soluble polymers. Viscosities of these solutions were measured by means of a Contraves low shear viscometer, model LS30, using a No. 1 cup and No. 1 bob. Temperatures were controlled to $\pm 0.1$ C. and measurements were made at a variety of rotational speeds corresponding to shear rates from about 1.0 $\sec^{-1}$ to about 100 $\sec^{-1}$. In contrast to conventional water soluble polymers, and relatively low molelcular weight weakly associating polymers, the terpolymers used in the process of this invention can exhibit significant relaxation times which result in slow equilibration. To determine steady state viscosity values at a given stress or shear rate, relatively long measurement times were employed. This effect was most evident at higher polymer concentrations, higher polymer molecular weights and in regions of strong intermolecular hydrophobic associations.

An important property of the polymers used in secondary or tertiary processes for additional petroleum recovery is the viscosity retention of the polymer solution. Mechanical degradation of polymer solutions is caused by the high shear or elongational stress the polymer molecules experience during injection into the reservoir rock. The resultant permanent loss in viscosity is a result of a reduction in the polymer molecular weight. This, in turn, decreases the sweep efficiency of the polymer solution within the reservoir resulting in decreased petroleum recovery. Partially hydrolyzed polyacrylamide is known to mechanically degrade depending on the polymer molecular weight, polymer composition, mixing and injection rates, and the reservoir rock porosity and permeability.

DESCRIPTION OF THE PREFERRED EMBODIMENTS

The following examples illustrate the present invention without, however, limiting the same hereto.

EXAMPLE 1-18

Micellar Polymerizatin with Sulfonate Containing Monomers

Radical Initiation

A one liter Morton style kettle, fitted with a chilled water condenser, thermometer, nitrogen sparger, and mechanical stirrer, was charged with 500 ml of purified water. The water was refluxed for 1 hour with a nitrogen purge and then cooled to room temperature. Acrylamide, 8.11 g (0.11 mole), 6.62 g (0.023 mole) of AMPS ®, 0.265 g of N-octylacrylamide and 15 g of sodium dodecyl sulfate (SDS) were charged into the flask. The reaction solution was heated to 50° C. and 0.0047 g potassium persulfate was added. After 22.75 hours at 50° C. and 300 rpm stirring, the viscous solution was slowly poured into 3 L of methanol and the precipitated polymer was isolated by filtration. The polymer was then masticated in a Waring blender with 2 L of methanol for 30 seconds, filtered and dried under vacuum at room temperature. The yield of polymer was 10.73 g. A variety of terpolymers were prepared using similar procedures but with different amounts of acrylamide, AMPS ®, N-octylacrylamide, SDS and initiator levels, as shown in Table I.

EXAMPLE 19-41

Micellar Polymerization with Sulfonate Containing Monomers

Redox Initiation

A solution of 15.0 g of SDS in 500 ml of purified, deoxygenated water was prepared and 0.298 g of N-octylacrylamide, 12.24 g of acrylamide and 9.96 g of AMPS ® were added. The resulting clear solution was placed into a two liter Morton style resin kettle fitted with a chilled water condenser, thermometer, nitrogen sparger and mechanical stirrer. The solution was purged with nitrogen for 0.5 hours at 25.0° C., then 0.0114 g of potassium persulfate and 0.0075 g of sodium metabisulfite were added. After 16 hours of stirring at 300 rpm and 25.0° C., the reaction mixture was slowly poured into 3 L of methanol. The precipitated polymer was isolated and masticated with 1 L of methanol in a Waring blender for 30 seconds, filtered and dried under vacuum at 30° C. The yield of polymer was 15.4 g. A variety of terpolymers were prepared using similar low temperature redox initiation procedures but with different amounts of acrylamide, AMPS ®, N-octylacrylamide, SDS and initiator levels, as shown in Table II.

EXAMPLE 42

Solution Viscometrics

Polymer solutions were prepared by the slow addition of a weighed polymer sample to rapidly stirred 2% NaCl solution. Upon complete addition, the stirring was stopped and the flask was sealed under nitrogen. Dissolution was allowed to progress with mild agitation for 24 hours or longer, until solutions were homogeneous and clear. For characterization in brines containing divalent cations a mixture of 3.0% NaCl and 0.3% CaCl$_2$ was used and designated as 3.3% brine. To prepare these solutions polymers were initially hydrated in water, followed by addition of concentrated brine solution to give the final polymer concentration of 1,500 ppm in 3.3% brine.

Viscosities of these solutions were measured by means of a Contraves ® low shear viscometer, model LS30, using a No. 1 cup and No. 1 bob. Temperatures were controlled to ±0.1° C. and measurements were made at a variety of rotational speeds corresponding to shear rates from about 1.0 sec$^{-1}$ to about 100 sec$^{-1}$. In contrast to conventional water soluble polymers and relatively low molecular weight, weakly associating polymers, the terpolymers of this invention can exhibit significant relaxation times, which result in slow equilibration. To determine steady state viscosity values at a given stress or shear rate, relatively long measurement times were employed. This effect is most evident at higher polymer concentrations, higher polymer molecular weights and in regions of strong intermolecular hydrophobic associations. Intrinsic viscosity was determined using Ubbelohde capillary viscometers. The solvent for these measurements was 2% NaCl solutions.

The influence of hydrophobic associations and sulfonate monomer content on solution rheological properties is illustrated in Table III. The solution viscosities were measured at shear rates of 1.3 and 11 sec$^{-1}$ on solutions containing 1,500 ppm polymer in 3.3% brine. The presence of only 0.75 mole percent octylacrylamide has increased the low shear viscosity by more than an order of magnitude, as observed by comparing Example number 20 and 21 in Table III. A further increase in viscosity is noted by simultaneously raising both the AMPS ® level and hydrophobe content. These significant enhancements in solution viscosity are due to changes in solubility and hydrophobic associations and have little to do with polymer molecular weight. This is indicated by the approximately constant value of the intrinsic viscosity, which is a measure of molecular weight. The presence of associations is evidenced by the jump in the Huggins' coefficient from 0.4, for the nonassociating polymers, to about 1.5, for the associating polymers.

The synthesis conditions can have a dramatic effect on polymer molecular weight. Increasing reactor monomer concentration brought about significant increases in solution viscosity, as shown in Table IV, for a series of terpolymers containing 30 mole percent AMPS and 0.75 mole percent C$_8$AM. A linear response of solution viscosity was observed as the monomer concentration was increased from 4.5 to 9 weight percent. Doubling the monomer concentration from 4.5 to 9 weight percent resulted in a five-fold increase in viscosity at 11 sec$^{-1}$.

EXAMPLE 43

Effect of AMPS ® Content on Micellar Polymerization

The effect of the amount of AMPS ® in the terpolymer on the solution viscosity in brine was to decrease the viscosity with increased AMPS ®, as shown in Table V. The experiments were done at a constant concentration (4.5 weight percent) of total monomers and C$_8$AM charge (0.75 mole percent). The loss of viscosification efficiency with increasing AMPS ® content could be explained on the basis of decreased molecular weight and associations. Although either cause is plausible, the effect still needs to be overcome. As described in Examples 42 and 44, this loss of viscosification can be compensated for by adjustment of reactor monomer concentration and hydrophobe level, respectively.

EXAMPLE 44

Effect of Hydrophobic Monomer Concentration

The influence of hydrophobe level on polymer solution viscosity can be seen from the data in Table VI for two series of polymers containing 30 and 40 mole percent AMPS ®, respectively. The total monomer concentration was held at 4.5 weight percent and the hydrophobe, N-1-octylacrylamide, concentration was varied from 0 to 1.5 mole percent. The maximum response in viscosity occurred at 1.0% for 30 mole percent AMPS ® and 1.25% for the 40 mole percent AMPS ® series. The viscometric data further indicates that the increase in viscosification occurs at a relatively narrow level of hydrophobic groups which depends on the level of sulfonate monomer in the polymer. This is unexpected based on the prior art.

EXAMPLE 45

Effect of Surfactant Level

The concentration of surfactant used during micellar polymerization can have a significant effect on the resultant hydrophobe-containing polymer. The solution viscosity data in Table VII are for a series of 40 mole percent AMPS ® terpolymers at two levels of hydrophobe, 0.75 and 1.0 mole percent. At 0.75 mole percent $C_8AM$ maximum viscosity was achieved at a sodium dodecyl sulfate (SDS) concentration of 2 weight percent. Increasing the hydrophobe level required 3 weight percent SDS to achieve maximum viscosity.

The solution clarity of hydrophobically associating polymers can be used as a measure of polymer solubility. Thus, low concentration of surfactant used during micellar polymerization result in polymers with poor solubility in brine. The brine solutions of these polymers are turbid and less viscous. As the surfactant concentration is increased during polymerization, the brine solutions of the resultant polymers become clearer. It can also be seen that there is an optimum concentration of surfactant at which the maximum solution viscosity is attained. The optimum surfactant concentration is a function of the hydrophobe content of the polymer; the optimum surfactant concentration increases as the hydrophobe concentration increases. In addition, the optimum type and content of surfactant used in the micellar polymerization is a function of the type and amount of sulfonate monomer.

EXAMPLE 46

Hydrolytic Stability of SRAM Polymers

Polymer solutions were prepared containing 0.2 wt% polymer in a 3.3% brine (3 wt% NaCl and 0.3 wt% $CaCl_2$). Samples of these solutions were aged at constant elevated temperatures. Periodically samples were withdrawn for measurement of the extent of conversion of acrylamide to acrylate functionality via hydrolysis. The method for the determination of the degree of hydrolysis consisted of: 1. dialysis to remove or reduce the concentration of extraneous salts; 2. treatment of the dialyzate salts with ion exchange resin to convert carboxylate groups on the hydrolyzed polymer to carboxylic acid groups; 3. gravimetric determination of the polymer concentration in the ion exchange resin-treated solution and 4. titration of the ion exchange resin-treated solution to determine the acid content. The sulfonate content of the original polymer must be accounted for in the determination since it was titrated along with the carboxylate functionality resulting from hydrolysis.

As can be seen from the results presented in Table VIII, hydrolytic stability of acrylamide based polymers were significantly improved by the presence of the sulfonate containing AMPS ® monomer. In addition, resistance to hydrolysis increased as the sulfonate monomer content increased as shown by the reduced level of hydrolysis with time for the polymer with 40 mol% AMPS ® (Example 19) as compared to the 20 mol% AMPS ® polymer (Example 20). The improvement in hydrolytic stability translates into an increased upper use temperature for mobility control in high temperature reservoirs.

EXAMPLE 47

Mechanical Stability

The mechanical stability of the SRAM polymer systems along with a partially hydrolyzed polyacrylamide system was monitored by determining the viscosity of the effluent polymer solution after passage through Berea sandstone having a nominal porosity of 0.2 and permeability of 500 ml. Fresh polymer solution of 1500 ppm concentration in 3.3% brine was pumped through a 0.5" diameter Berea sandstone disk by means of a dual piston constant flow rate pump. The disk had a nominal length of 0.5" and permeability under one darcy for the systems studied. The disk was cut to the above dimensions from a Berea sandstone rod, which was epoxy coated to prevent fluid loss from the disk sides during the flow process. Cutting of the Berea disk was accomplished with a diamond saw blade using 3.3% brine as the cutting fluid. The disk was briefly sonicated to remove sandstone fines from the disk faces followed by vacuum drying. Subsequently, the disk was placed into a stainless steel holder equipped to measure the pressure drop across the disk by means of pressure transducers. The permeability was determined by flowing the 3.3% brine solvent, measuring the pressure drop, flow rate, and using Darcy's Law, $$Q = \frac{KA \Delta P}{\eta L}$$

where Q=flow rate, cc/sec, K=permeability, darcies, A=disk area, $cm^2$, =fluid viscosity, cP, L=disk length, cm, and P=pressure drop, atmospheres. Polymer solution was then injected using various flow rates. The extent of mechanical degradation was monitored by measuring the effluent viscosity at a shear rate of $11.0\ s^{-1}$ which corresponds to a flux (flow) of 1 ft/day through the reservoir.

The SRAM Examples, 42 and 43, as shown in Table IX are similar in composition to Examples 20 and 34 shown in Table II, respectively. Examples 42 and 43 were composite blends of multiple syntheses. As shown the mechanical stability of the SRAM polymers, Examples 42 and 43, was superior to a commercial partially hydrolyzed polyacrylamide system, HPAM. Examples 42 and 43, containing 20 and 30 mol% AMPS ® with 0.75 mole % hydrophobe, respectively, maintained 50% of their original viscosity up to a flux of about 1000 ft/day. In contrast, the HPAM system lost 50% of original viscosity at a flux of only 50 ft/day. This 20 fold increase in flux for 50% viscosity retention for the SRAM systems represents a significant improvement in the mechanical stability compared to hydrolyzed polyacrylamide. Thus, less polymer concentration would be needed to provide a fixed degree of mobility control in the reservoir during enhanced oil recovery operations.

EXAMPLE 43

Resistance Factor

In conjunction with monitoring the mechanical stability of the SRAM polymer systems, Example 42 and 43, the polymer resistance factor was determined. The polymer resistance factor is the ratio of the brine and polymer solution mobilities (Mp) calculated by, $$R = Mw/Mp = (Kw/\eta_w)/(Kp/\eta_p)$$

where the subscripts w and p refer to water (or brine) and polymer solution, respectively. In an oil bearing formation, oil typically has a higher viscosity than the water phase, therefore, to improve the recovery of oil, the mobility ratio needs to be increased. This is accomplished by increasing the driving fluid (polymer solution) viscosity, which would increase the polymer resistance factor. As shown in Table X, the resistance factor for the SRAM polymer systems, Example 42 and 43, showed a pseudoplastic behavior with increasing flux between about 2 to 1000 ft/day. By comparison an HPAM system, had a significantly lower resistance factor at low flux and reached a plateau at about 10 ft/day flux, where a pseudoplastic response begins. At the typical flux of 1 ft/day in a reservoir, the higher resistance factor for the SRAM polymer indicates an improvement in thickening efficiency which could translate into a more economically attractive recovery process.

TABLE I

POLY(N—OCTYLACRYLAMIDE-ACRYLAMIDE-AMPS ®) TERPOLYMERS

| Example No. | Hydrophobe Mole % | AMPS ® Mole % | SDS Conc Wt. % | Initiator Level $[M]/[I]0.5$ | Yield g | Yield % |
|---|---|---|---|---|---|---|
| 1 | 0.0 | 20 | 2.0 | 49 | 13.8 | 92 |
| 2 | 0.0 | 20 | 3.0 | 49 | 14.4 | 96 |
| 3 | 1.0 | 20 | 2.0 | 49 | 10.7 | 71 |
| 4 | 0.75 | 20 | 2.0 | 49 | 14.0 | 93 |
| 5 | 1.0 | 30 | 2.0 | 49 | 14.0 | 93 |
| 6 | 0.50 | 20 | 2.0 | 49 | 11.0 | 73 |
| 7 | 1.0 | 10 | 2.0 | 49 | 13.1 | 87 |
| 8 | 1.0 | 20 | 3.0 | 49 | 11.6 | 77 |
| 9 | 1.0 | 20 | 3.0 | 49 | 12.9 | 86 |
| 10 | 1.0 | 20 | 3.0 | 49 | 7.3 | 49 |
| 11 | 1.0 | 10 | 3.0 | 49 | 10.9 | 73 |
| 12 | 1.0 | 30 | 3.0 | 49 | 5.0 | 33 |
| 13 | 0.75 | 20 | 3.0 | 49 | 7.2 | 48 |
| 14 | 1.25 | 20 | 3.0 | 49 | 7.2 | 48 |
| 15 | 1.0 | 20 | 3.0 | 100 | 5.7 | 38 |
| 16 | 1.0 | 20 | 3.0 | 49 | 12.2 | 81 |
| 17 | 1.0 | 10 | 3.0 | 49 | 13.1 | 87 |
| 18 | 1.0 | 30 | 3.0 | 49 | 11.3 | 75 |

TABLE II

POLY(N—OCTYLACRYLAMIDE-ACRYLAMIDE-AMPS ®) TERPOLYMERS

| Example No. | Hydrophobe Mole % | AMPS ® Mole % | Redox Initiators, $M \times 10^5$ $K_2S_2O_8$ | Redox Initiators, $M \times 10^5$ $Na_2S_2O_5$ | Yield g | Yield % |
|---|---|---|---|---|---|---|
| 19 | 1.25 | 40 | 4.6 | 4.6 | 16.7 | 67 |
| 20 | 0.75 | 20 | 7.9 | 7.49 | 15.3 | 64 |
| 21 | 0.0 | 20 | 7.4 | 7.6 | 16.4 | 68 |
| 22 | 0.75 | 40 | 8.6 | 2.3 | 20.6 | 82 |
| 23 | 0.75 | 40 | 4.3 | 4.6 | 20.5 | 82 |
| 24 | 0.75 | 30 | 5.5 | 5.9 | 14.8 | 61 |
| 25 | 0.75 | 30 | 5.5 | 5.9 | 21.4 | 68 |
| 26 | 0.75 | 20 | 3.7 | 4.0 | 31.9 | 64 |
| 27 | 0.75 | 30 | 5.5 | 5.9 | 12.3 | 51 |
| 28 | 1.25 | 30 | 5.5 | 5.9 | 14.9 | 63 |
| 29 | 1.0 | 40 | 4.3 | 4.6 | 14.0 | 58 |
| 30 | 1.25 | 40 | 4.3 | 4.6 | 15.1 | 62 |
| 31 | 1.5 | 30 | 5.4 | 5.9 | 16.7 | 68 |
| 32 | 0.0 | 30 | 2.8 | 3.0 | 31.8 | 65 |
| 33 | 0.0 | 40 | 2.2 | 2.3 | 38.8 | 74 |
| 34 | 0.75 | 30 | 5.5 | 5.9 | 46.4 | 94 |
| 35 | 1.0 | 40 | 4.3 | 4.6 | 46.2 | 93 |
| 36 | 1.0 | 40 | 4.3 | 4.6 | 46.1 | 94 |
| 37 | 1.0 | 40 | 4.3 | 4.6 | 44.4 | 91 |
| 38 | 0.75 | 40 | 4.3 | 4.6 | 43.2 | 88 |
| 39 | 0.75 | 40 | 4.3 | 4.6 | 44.4 | 90 |
| 40 | 0.75 | 40 | 4.3 | 4.6 | 42.1 | 87 |
| 41 | 0.75 | 40 | 2.1 | 2.3 | 47.0 | 92 |

TABLE III

SOLUTION PROPERTIES OF REDOX POLYMERIZED AMPS ® TERPOLYMERS

| Example No. | Hydrophobe Mole % | AMPS ® Mole % | Viscosity, cP, at $1.3 sec^{-1}$ | Viscosity, cP, at $11 sec^{-1}$ | Intrinsic Viscosity dl/g | Huggins' Coefficient |
|---|---|---|---|---|---|---|
| 20 | 0.75 | 20 | 73 | 26 | 10.0 | 1.5 |
| 27 | 1.0 | 30 | 52 | 25 | 10.4 | 1.3 |
| 30 | 1.25 | 40 | 289 | 45 | 9.2 | 1.4 |
| 21 | 0.0 | 20 | 4.8 | 4.8 | 13 | 0.4 |

TABLE IV

EFFECT OF MONOMER CONCENTRATION ON TERPOLYMER SOLUTION VISCOMETRICS
Polymer Composition: N—C$_8$AM = 0.75 mole %, AMPS ® = 30.0 mole %

| Example No. | Monomer Concentration | Viscosity, cP at 1,500 ppm in 3.3% Brine $1.3 sec^{-1}$ | Viscosity, cP at 1,500 ppm in 3.3% Brine $11 sec^{-1}$ |
|---|---|---|---|
| 24 | 0.38 | 7.8 | 6.7 |
| 25 | 0.50 | 17 | 13 |
| 34 | 0.75 | 84 | 25 |

TABLE V

EFFECT OF AMPS ® ON TERPOLYMER SOLUTION VISCOSITY

| Example No. | AMPS ® Mole % | Viscosity, cP at 1,500 ppm in 3.3% Brine $1.3 sec^{-1}$ | Viscosity, cP at 1,500 ppm in 3.3% Brine $11 sec^{-1}$ |
|---|---|---|---|
| 20 | 20 | 73 | 25 |
| 24 | 30 | 8 | 7 |
| 23 | 40 | 6 | 5 |

TABLE VI

EFFECT OF HYDROPHOBIC MONOMER CONCENTRATION

| Exp. No. | N—C8AM Mole % | AMPS ® Mole % | Vicosity, cP at 1,500 ppm in 3.3% Brine $1.3 sec^{-1}$ | Vicosity, cP at 1,500 ppm in 3.3% Brine $11 sec^{-1}$ |
|---|---|---|---|---|
| 32 | 0 | 30 | 5 | 5 |
| 24 | 0.75 | 30 | 8 | 7 |
| 27 | 1.0 | 30 | 378 | 54 |
| 28 | 1.25 | 30 | 79 | 25 |
| 31 | 1.5 | 30 | 13 | 8 |
| 33 | 0 | 40 | 4 | 4 |
| 22 | 0.75 | 40 | 6 | 5 |
| 29 | 1 | 40 | 7 | 6 |
| 19 | 1.25 | 40 | 279 | 44 |

TABLE VII

EFFECT OF SURFACTANT CONCENTRATION ON TERPOLYMER SOLUTION VISCOSITY

Hydrophobic Monomer = $C_8AM$, AMPS ® = 40 Mole %

| Example No. | $C_8AM$ Mole % | SDS Wt. % | Viscosity, cP, at 1,500 ppm in 3.3% Brine | |
|---|---|---|---|---|
| | | | 1.3 sec$^{-1}$ | 11 sec$^{-1}$ |
| 39 | 0.75 | 1.5 | 74 | 22 |
| 38 | 0.75 | 2 | 70 | 23 |
| 40 | 0.75 | 2.5 | 10 | 9 |
| 41 | 0.75 | 3 | 8 | 6 |
| 35 | 1 | 3 | 114 | 24 |
| 37 | 1 | 4.5 | 8 | 6 |
| 36 | 1 | 6 | 5 | 5 |

TABLE VIII

Hydrolytic Stability of SRAM Polymers

| Example No. | $C_8AM$ mol % | AMPS ® mol % | Time days | Hydrolysis, mol % A.A. | |
|---|---|---|---|---|---|
| | | | | 80 C. | 93 C. |
| PAM* | 0 | 0 | 20 | — | 24 |
| | | | 40 | — | 45 |
| | | | 60 | — | 62 |
| | | | 100 | — | 78 |
| 20 | 0.75 | 20 | 20 | 8 | 15 |
| | | | 40 | 15 | 26 |
| | | | 60 | 19 | 31 |
| | | | 100 | 28 | 47 |
| 19 | 1.25 | 40 | 20 | 8 | 12 |
| | | | 40 | 13 | 20 |
| | | | 60 | 15 | 27 |
| | | | 100 | 16 | 36 |

*polyacrylamide

TABLE IX

MECHANICAL STABILITY PROPERTIES OF SRAM POLYMERS

| Example No. | AMPS ® Mole % | Hydrophobe Mole % | Flux Ft/Day | Viscosity, cP 11.0 sec$^{-1}$ |
|---|---|---|---|---|
| 42 | 20 | 0.75 | 1.8 | 34. |
| | | | 4.4 | 30. |
| | | | 9.2 | 30. |
| | | | 17.4 | 34. |
| | | | 26.6 | 37. |
| | | | 36.7 | 37. |
| | | | 46.8 | 39. |
| | | | 93.6 | 37. |
| | | | 192.8 | 35. |
| | | | 403.9 | 31. |
| | | | 605.9 | 25. |
| | | | 798.7 | 21. |
| | | | 1102.0 | |
| 43 | 30 | 0.75 | 1.8 | 20. |
| | | | 4.6 | 21. |
| | | | 9.1 | 18. |
| | | | 27.9 | 21. |
| | | | 36.5 | 21. |
| | | | 45.7 | 21. |
| | | | 91.4 | 22. |
| | | | 182.7 | 23. |
| | | | 411.0 | 22. |
| | | | 630.5 | 17. |
| | | | 850.0 | 16. |
| | | | 1124.0 | 15. |
| Commercial HPAM | | | 1.9 | 12. |
| | | | 4.9 | 15. |
| | | | 10.0 | 14. |
| | | | 29.9 | 11. |
| | | | 51.0 | 8. |
| | | | 77.0 | 7. |
| | | | 149.0 | 5. |
| | | | 384.0 | 4. |
| | | | 683.0 | 3. |
| | | | 982.0 | 3. |

TABLE X

RESISTANCE FACTOR OF SRAM POLYMER SYSTEMS

| Example No. | AMPS ® Mole % | Hydrophobe Mole % | Flux Ft/Day | Resistance Factor |
|---|---|---|---|---|
| 42 | 20 | 0.75 | 1.8 | 359. |
| | | | 4.4 | 208. |
| | | | 9.2 | 134. |
| | | | 17.4 | 64. |
| | | | 26.6 | 57. |
| | | | 36.7 | 52. |
| | | | 46.8 | 60. |
| | | | 93.6 | 48. |
| | | | 192.8 | 34. |
| | | | 403.9 | 28. |
| | | | 605.9 | 30. |
| | | | 798.7 | 28. |
| | | | 1102.0 | 25. |
| 43 | 30 | 0.75 | 1.8 | 376. |
| | | | 4.6 | 187. |
| | | | 9.1 | 151. |
| | | | 27.9 | 92. |
| | | | 36.5 | 84. |
| | | | 45.7 | 78. |
| | | | 91.4 | 57. |
| | | | 182.7 | 49. |
| | | | 411.0 | 44. |
| | | | 630.5 | 44. |
| | | | 850.0 | 42. |
| | | | 1124.0 | 40. |
| Commercial HPAM | | | 1.9 | 70. |
| | | | 3.1 | 124. |
| | | | 4.9 | 213. |
| | | | 10.0 | 265. |
| | | | 29.9 | 210. |
| | | | 51.0 | 155. |
| | | | 77.0 | 120. |
| | | | 149.0 | 79. |
| | | | 384.0 | 45. |
| | | | 683.0 | 32. |
| | | | 982.0 | 27. |

What is claimed is:

1. A water flooding process for the secondary recovery of oil from a production well comprising injecting an aqueous solution under pressure to force oil to the production well, said aqueous solution comprising:
   (a) water; and
   (b) about 100 to about 5,000 ppms of a water soluble polymer having the formula:

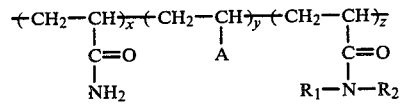

wherein $R_1$ is a $C_6$ to $C_{22}$ straight chained or branched alkyl or alkylcycloalkyl group; $R_2$ is hydrogen or a $C_6$ to $C_{22}$ straight chained or branched alkyl or cycloalkyl group or a $C_1$ to $C_3$ straight chained or branched alkyl group; and A is selected from the groups consisting of $SO_3^-M^+$, phenyl-$SO_3^-M^+$, and $CONHC(CH_3)_2CH_2SO_3^-M^+$, wherein $n^+$ is an alkali metal or ammonium cation, wherein x is about 5 to 98 mole percent, y is about 2 to about 95 mole percent, z is about 0.1 to about 10.0 mole percent.

2. A process according to claim 1 wherein $M^+$ is a sodium cation.

3. A process according to claim 1 wherein $R_1$ is an octyl group.

4. A process according to claim 1 wherein $R_1$ is a dodecyl group.

5. A process according to claim 1 wherein $R_1$ is a decyl group.

6. A process for recovering oil from a production well comprising injecting an aqueous solution under pressure to force oil to the production well, said aqueous solution comprising:
(a) water;
(b) about 0.1 to 5.0 weight percent of a surfactant; and
(c) about 100 to about 5,000 ppms of a water soluble polymer having the formula:

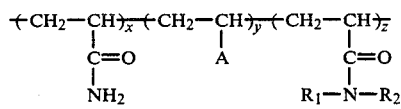

wherein $R_1$ is a $C_6$ to $C_{22}$ straight chained or branched alkyl or alkylcycloalkyl group; $R_2$ is hydrogen or a $C_6$ to $C_{22}$ straight chained or branched alkyl or cycloalkyl group or a $C_1$ to $C_3$ straight chained or branched alkyl group; and A is selected from the group consisting of $SO_3^-M^+$, phenyl-$SO_3^{-M+}$ and $CONHC(CH_3)_2SO_3^-M^+$, wherein $M^+$ is an alkali metal or ammonium cation, wherein x is about 5 to 98 mole percent, y is about 2 to about 95 mole percent, z is about 0.1 to about 10.0 mole percent.

7. A process according to claim 6 wherein $M^+$ is a sodium cation.

8. A process according to claim 6 wherein $R_1$ is an octyl group.

9. A process according to claim 6 wherein $R_1$ is a dodecyl group.

10. A process according to claim 6 wherein $R_1$ is a decyl group.

* * * * *